(12) United States Patent
Zang et al.

(10) Patent No.: US 8,935,363 B2
(45) Date of Patent: Jan. 13, 2015

(54) SYSTEM AND METHOD FOR DELIVERING MULTIMEDIA CONTENT FOR PLAYBACK THROUGH NETWORK

(75) Inventors: Joanna Zang, Beijing (CN); Qiang Huang, Beijing (CN); Xuelin Cao, Beijing (CN); Bo Tian, Beijing (CN)

(73) Assignee: Streamocean, Inc., George Town, Grand Cayman ( * ) Notice: Subject to any disclaimer, the term of this patent is extended or adjusted under 35 U.S.C. 154(b) by 222 days.

(21) Appl. No.: 13/513,831

(22) PCT Filed: Dec. 4, 2009

(86) PCT No.: PCT/CN2009/075331
§ 371 (c)(1),
(2), (4) Date: Jun. 13, 2012

(87) PCT Pub. No.: WO2011/066691
PCT Pub. Date: Jun. 9, 2011

(65) Prior Publication Data
US 2012/0246279 A1    Sep. 27, 2012

(51) Int. Cl.
G06F 15/16      (2006.01)
H04L 29/06      (2006.01)
H04N 21/442     (2011.01)
H04N 21/262     (2011.01)
H04N 21/6373    (2011.01)
H04N 21/2343    (2011.01)
H04N 21/845     (2011.01)
H04N 21/643     (2011.01)
H04L 12/26      (2006.01)

(52) U.S. Cl.
CPC ...... H04N 21/23439 (2013.01); H04N 21/8456 (2013.01); H04L 65/80 (2013.01); H04N 21/44209 (2013.01); H04L 65/608 (2013.01); H04L 65/4076 (2013.01); H04N 21/26258 (2013.01); H04N 21/64322 (2013.01); H04L 43/0864 (2013.01); H04N 21/6373 (2013.01)
USPC ............................. 709/219; 709/231; 725/86

(58) Field of Classification Search
CPC .................. H04N 21/23439; H04N 21/2662; H04N 21/84; H04N 21/8456; H04N 21/64769; H04L 65/607
USPC ......................................................... 709/219
See application file for complete search history.

(56) References Cited

U.S. PATENT DOCUMENTS 6,356,945 B1 *   3/2002   Shaw et al. ................... 709/231
6,404,891 B1 *   6/2002   Seitz et al. .................... 381/107

(Continued)

FOREIGN PATENT DOCUMENTS

| CN | 101075957 | 11/2007 |
| CN | 101286157 | 10/2008 |
| CN | 101324898 | 12/2008 |

OTHER PUBLICATIONS

PCT/CN2009/075331 International Search Report dated Sep. 9, 2010 (2 page).

(Continued)

Primary Examiner — Tauqir Hussain
(74) Attorney, Agent, or Firm — Michael Best & Friedrich LLP

(57) ABSTRACT

A system and method that transmits multimedia content over a long distance through network for prompt display of the transmitted multimedia content, wherein multimedia content are encoded into streaming format data files that enables smooth transmission and continuous display of multimedia content, said streaming format reflects inherent temporal characteristic of multimedia content, said streaming data files are arranged in a way that allows access and retrieval through hypertext transfer protocol, or HTTP, and the transmission of multimedia content is regulated in a way that adapts to the inherent characteristics and/or real-time traffic condition of the network or display progress.

66 Claims, 8 Drawing Sheets

(56) References Cited

U.S. PATENT DOCUMENTS

| | | | |
|---|---|---|---|
| 6,438,604 B1 * | 8/2002 | Kuver et al. | 709/234 |
| 7,107,606 B2 * | 9/2006 | Lee | 725/87 |
| 7,477,631 B2 * | 1/2009 | Chen et al. | 370/338 |
| 7,577,110 B2 * | 8/2009 | Zimmermann et al. | 370/260 |
| 7,778,326 B1 * | 8/2010 | Chen et al. | 375/240.01 |
| 7,779,146 B2 * | 8/2010 | Deshpande | 709/233 |
| 7,783,773 B2 * | 8/2010 | Wu et al. | 709/231 |
| 8,031,771 B2 * | 10/2011 | Chen et al. | 375/240.1 |
| 8,370,514 B2 * | 2/2013 | Hurst et al. | 709/231 |
| 8,402,156 B2 * | 3/2013 | Brueck et al. | 709/231 |
| 8,526,432 B2 * | 9/2013 | Wu | 370/390 |
| 8,577,989 B2 * | 11/2013 | Broda | 709/217 |
| 8,635,356 B2 * | 1/2014 | Park et al. | 709/231 |
| 8,732,326 B2 * | 5/2014 | Su et al. | 709/231 |
| 2003/0131098 A1 | 7/2003 | Huntington et al. | |
| 2004/0031054 A1 * | 2/2004 | Dankworth et al. | 725/86 |
| 2006/0080715 A1 | 4/2006 | Park et al. | |
| 2009/0043906 A1 * | 2/2009 | Hurst et al. | 709/231 |

OTHER PUBLICATIONS

Supplemental European Search Report for European Application No. 09851791 dated Nov. 5, 2013 (10 pages).

First Chinese Office Action for Chinese Application No. 200980162756.3 dated Apr. 14, 2014 (29 pages).

Pantos, R. et al., "HTTP Live Streaming; draft-pantos-http-live-streaming-02.txt" Internet Engineering Task Force, IETF; Standard Working Draft, Internet Societ (ISOC) 4, Rue Des Falaises Ch-1205, Geneva, Switzerland, No. 2, Oct. 5, 2009 [retrieved on Oct. 5, 2009] (16 pages).

* cited by examiner

SYSTEM AND METHOD FOR DELIVERING MULTIMEDIA CONTENT FOR PLAYBACK THROUGH NETWORK

FIELD OF THE INVENTION

The invention relates to a multimedia content transmission system and method, more particularly relates to a system and method that transmits multimedia content over a long distance through network for prompt playback of the transmitted multimedia content.

BACKGROUND OF THE INVENTION

Currently, multimedia content, for instance a video transmitted over the HTTP protocol, is viewed over the Internet via downloading or progressive downloading. In downloading, video content is displayed after the full video content has been downloaded, which usually results in a long startup delay before the video content can be viewed. With a large video file, the wait time is unacceptable and thus downloading is not suitable for online video playback. In addition, the high failure rate and retransmission in transport can also lead to waste of bandwidth and undue traffic congestion of the network.

Another method for network transmission of multimedia content is through progressive downloading, with which video can be played as soon as a small portion of it has been downloaded and the display startup delay is therefore reduced. The viewer can choose to continue playing the video while it is being downloaded or finish playing it. However, if the viewer stops playing the video in the middle, the entire video file may have already been downloaded and all the bandwidth would have been consumed. In addition, due to the Transmission Control Protocol (TCP) congestion control, end-to-end bandwidth fluctuates, which can cause frequent buffering, loaded user requests, and inconsistent server response time.

Traditionally there are two ways to limit bandwidth consumption in multimedia content transmission: Internet Protocol (IP) traffic shaping and multimedia content file slicing. While IP traffic shaping, i.e., with Linux, can only be set to single bit rate and therefore constraint the operation on mixed bit rate support, content file slicing often results in unnecessary operation overhead and inaccuracy in pacing due to the unnatural slicing, usually handled by content providers. Thus, it is highly desirable to have a multimedia content transmission system and a method that can offer accurate, native streaming control, and allow dynamic streaming of multimedia content in variable bit rate.

SUMMARY OF THE INVENTION

The present invention uniquely combines the advantages of HyperText Transfer Protocol (HTTP) progressive downloading and Real Time Streaming Protocol (RTSP)-like streaming control of media playback. It solves the prolonged problem of transmitting multimedia content, for instance, video, in good quality over Internet, which allows multimedia content provider to reach users over long distance.

Specifically, the present invention involves an in-band streaming control that is in the fashion of Flash HTTP wherein the streaming pacing is in the fashion of RTSP/RTP style. The protocol is running on HTTP over TCP, which fully complies with mainstream video client players such as Flash and Silverlight. Moreover, the content provider's origin source is made accessible via a web service content publishing interface. Preferably, the invention devises a way to obtain TCP congestion window size or TCP buffer size, or measure TCP round-trip-delay. More preferably, the invention includes a server driven HTTP dynamic streaming, aka Server Side HTTP Smooth Streaming (SSHTTPSS). Unlike client driven HTTP Smooth Streaming, the present invention creates a feasible implementation for dynamically adjusting video streaming bit rate to adapt to bandwidth fluctuation.

In addition to Internet video-on-demand, this present invention applies to video surveillance, video conference, live broadcast, and beyond. It can also apply to Local Area Network (LAN)/Wide Area Network (WAN) environment, such as the application in Internet Protocol television (IPTV).

Alternatively, the invention may comprise various other methods and apparatuses.

Other features will be in part apparent and in part pointed out thereinafter.

BRIEF DESCRIPTION OF THE DRAWINGS

The features and advantages of the present invention will become apparent from the following detailed description of the present invention in which.

DETAILED DESCRIPTION OF THE INVENTION

Figure 1:
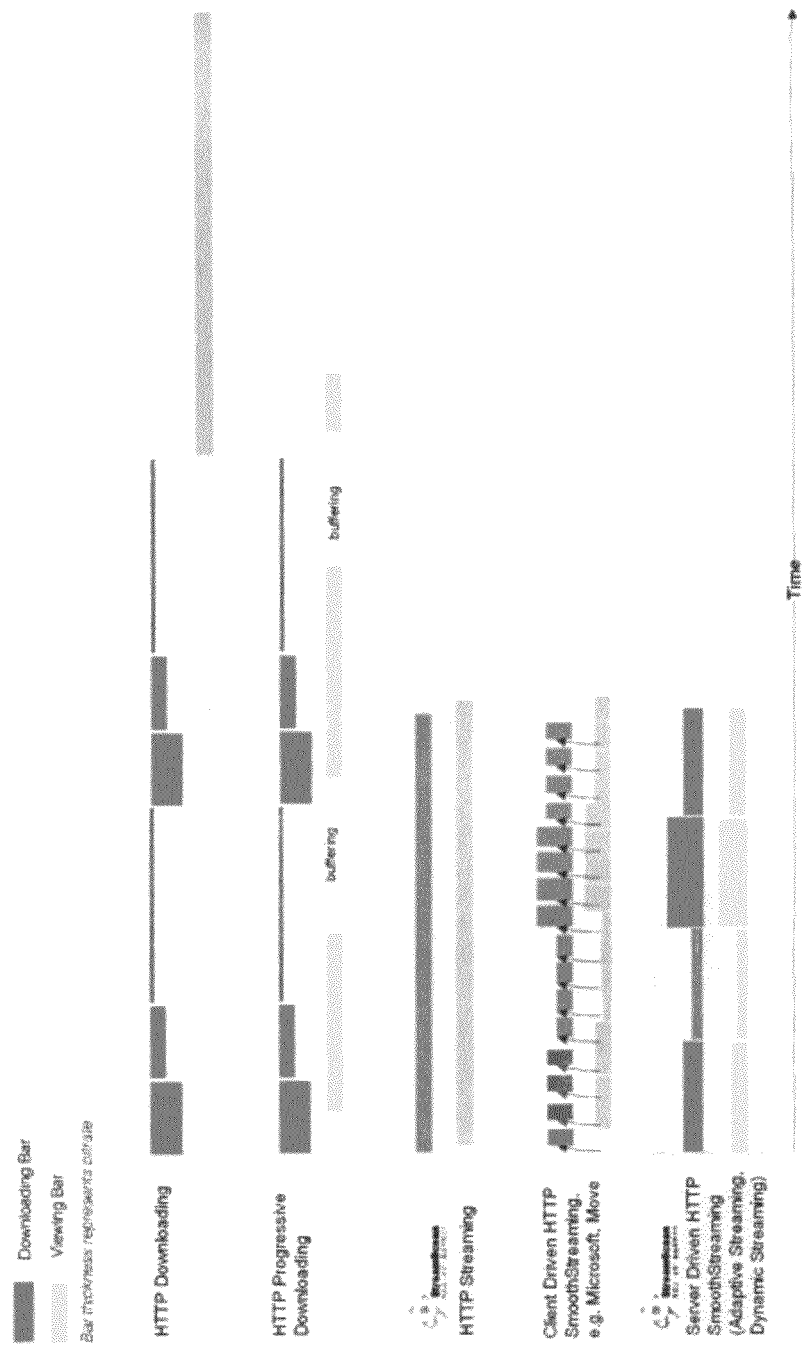
FIG. 1 is an exemplary diagram illustrating the advantages of Server Side HTTP Smooth Streaming (SSHTTPSS) over existing network transmission methods of multimedia content.

The present invention discloses a system to deliver multimedia content for display through a network, comprising subsystems that store, edit, transcoder, process, transmit, and display multimedia content, wherein the said subsystem, either independently or collectively, encodes multimedia content into streaming format data files that enables smooth transmission and continuous display of multimedia content, wherein the said streaming format reflects inherent temporal characteristic of multimedia content; and/or arranges streaming data files in a way that allows access and retrieval through hypertext transfer protocol, or HTTP; and/or regulates transmission of multimedia content in a way that adapts to the inherent characteristics and/or real-time traffic condition of the network, and/or display progress.

The above mentioned streaming format data files include: index files that contain information regarding inherent characteristics, temporal processing, and/or localization of the multimedia content; and cluster content files with each containing a portion of the multimedia content and an identifier for that portion of content. The said streaming format cluster content files are of configurable structure and size, generated in temporal series in the order by which each portion of content is displayed, and the temporal position of each portion of content during the display of the multimedia content is identifiable by the said identifier. The cluster content files may correspond to portions of multimedia content that overlap in temporal position.

The multimedia content as mentioned above includes those of video formats, which may be selected from a group of video formats including MPEG TS, FLV, MP4, and other suitable video formats.

The streaming format cluster content files as mentioned above are generated according to key video frames, aka, group of pictures (GOP). The streaming data files as mentioned above are accessible and retrievable according to hypertext transfer protocol, or HTTP. The streaming control mechanism employed in the present invention is in Flash style, which works around TCP congestion control to allow far reaching effect in the Internet without changing TCP stack.

With the present invention, the delivery of multimedia content through the network is monitored in a close-loop feedback style, with successful delivery notified in the system. The rate of access, retrieval, and transmission of streaming format data files are modified in real-time according to the network's delivery status as monitored in the system. One specific example of such a measurement being monitored is TCP buffer size. Other examples involve obtaining TCP congestion window size, measuring TCP Round Trip Delay (TCP-RTD), or using any heuristics for increasing or decreasing the rate of delivery. The modification in the rate of multimedia content delivery, including that for access, retrieval, and/or transmission of multimedia content data files is mainly performed by the subsystem or a component that sends out the content, for instance, a video server within a video delivery network (VDN), and not by the subsystem or a component that receives the content, for instance, a terminal used by a client to view the video.

The present invention applies to networks that employ transmission means including Internet, cable, local area network, wireless communication, and telecommunication.

The present invention applies to multimedia content displayed on devices that employ electronic display, including personal computers, television set, flat panel displays, as well as mobile devices such as a cell phone or mobile television. The present invention also applies to multimedia content displayed via projection, for instance, via digital projector or the like.

The present invention applies to delivery of multimedia content for applications such as video-on-demand, live broadcasting, telesurveillance, and video and voice over IP (VVOIP) applications.

The present invention also concerns a method to deliver multimedia content for display through network utilizing a system, a subsystem, or a component as mentioned above.

Although the specific examples provided in this disclosure focus on multimedia content, the method disclosed herein applies to files of all types and contents transmitted over a network. The application in the sector of multimedia content may be viewed as a preferred embodiment of the invention. It should not, however, impose any limitation on the broad usage of the present invention.

According to the invention, for VOD, pre-processing of multimedia content file may be involved. Using commercially available third party tools, for instance, FFMPEG or StreamOcean's XGATE, video of higher bitrate from the origin source can be transcoded in multiple bitrates. All files, regardless of the bitrate, have fixed keyframe interval. At keyframe point, the system, via a content access module (an integral component of the server), chooses the file of appropriate bitrate as adjusted per delivery condition at the time. Another embodiment of the present invention may involve video files in .flv format, in which case the .flv file can be modified by incorporating metadata and keyframe timecode/offset. Meanwhile, the system generates linear hint info of FLV metadata and keyframe timecode/offset maps to internal database at run-time for high performance data loading and streaming.

Figure 2:
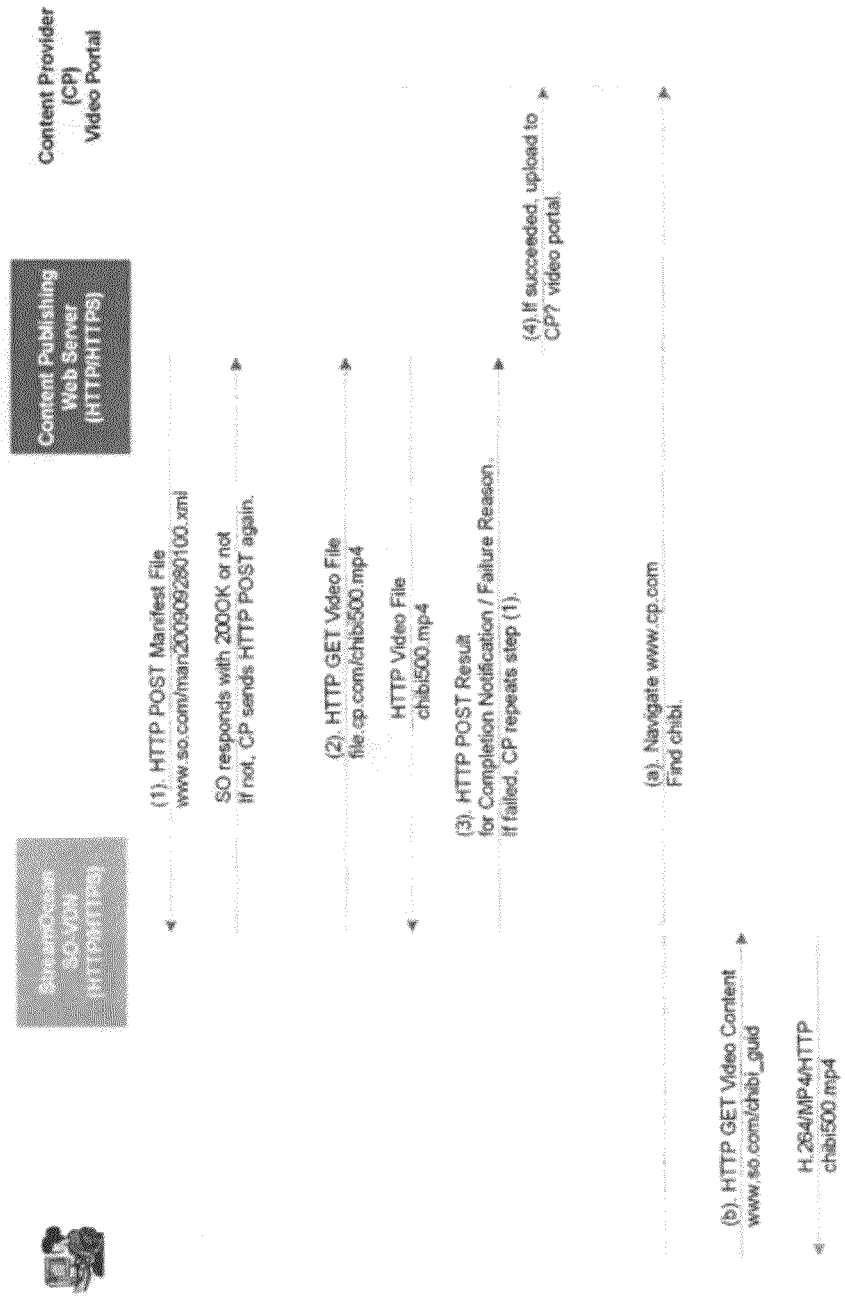
FIG. 2 is an exemplary diagram illustrating one embodiment of the system flow incorporating a web service content publishing interface for multimedia content transmission over the Internet according to the invention. Specifically it demonstrates the operation flow of the system especially with respect to a web service interface.
Figure 3:
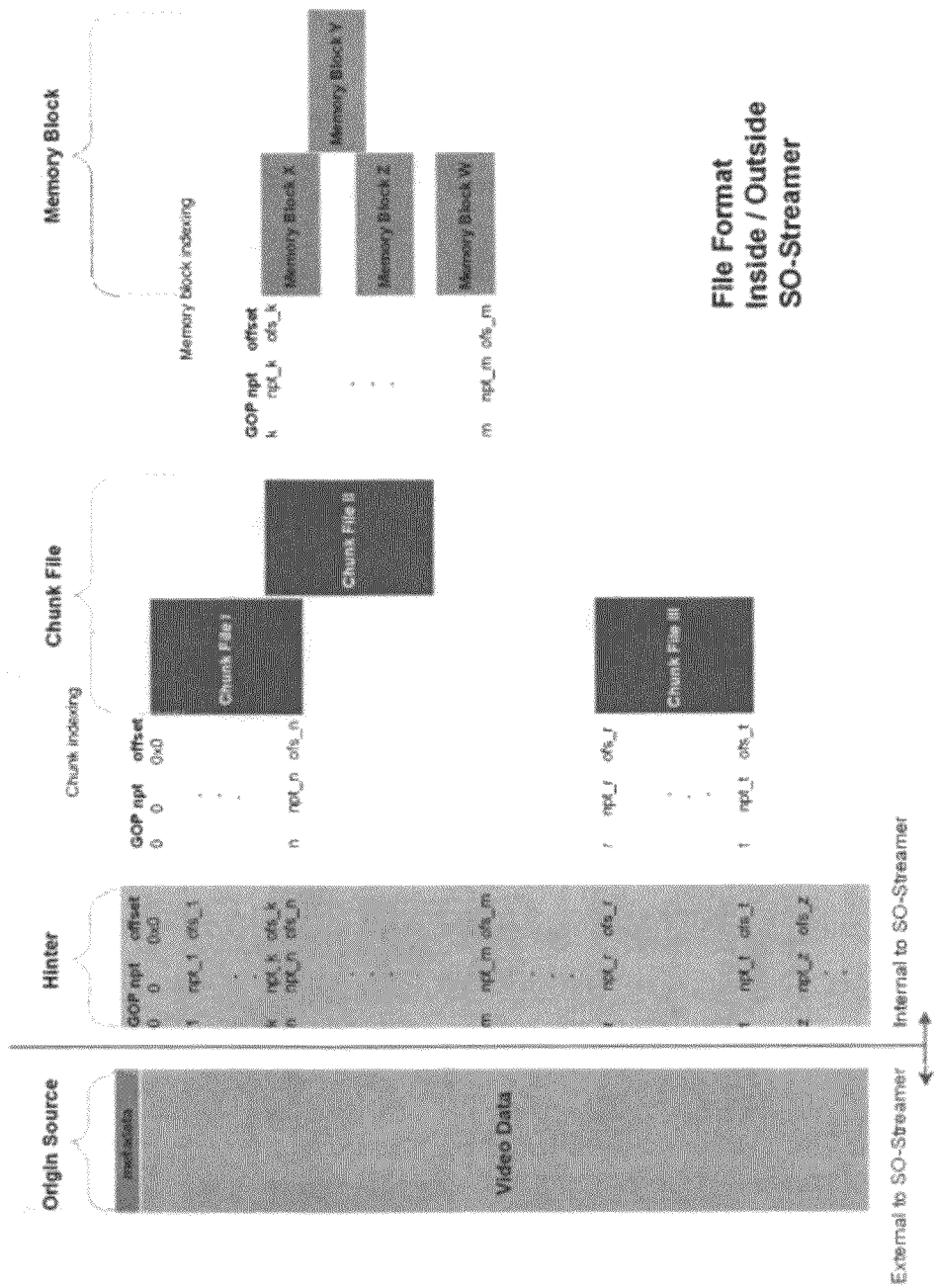
FIG. 3 is an exemplary diagram illustrating one embodiment of the system according to the invention. Specifically it demonstrates the file format and structure in the server of the system.

Referring now to FIG. 2 and FIG. 3, the system flow and the ingestion of multimedia content. First, content are published by the origin source (OS) via a web service interface in the pre-position process. Each content title may have multiple file names corresponding to different formats, bitrates, etc. The web service interface provides content manifest files which specify content title, description, file name, directory, format, bitrate, resolution, thumbnail, etc. together with the operation to be applied. The content processing control (as an integral component of the server) then parses the manifest file sent from OS, sends HTTP GET request to OS. OS then responds with the content file to be processed via HTTP. The content processing control may issue HTTP1.1 range requests to fetch the content file from OS, and simultaneously store OS content to local disk in chunk files and memory in blocks while receiving. During processing, a hinter, i.e., an array of {index, keyframe_sendtime, keyframe_byte_offset} is generated offline (for live broadcast, the hinter is generated real-time-on-the-fly), while OS video is cut into small chunks with its lower and upper boundaries set. The same storing mechanism is also used for memory caching. Finally, the ingestion result is sent back to OS via a server HTTP web interface after or in the middle of content processing, and OS updates the content links on its content portal for user to navigate.

In one embodiment of the invention, multimedia content files are stored as ranges in multi-level caches, for instance, disk chunk file and memory block, according to a naming convention such as {presid/cmesh/range_lo-range_hi}, wherein, presid is a 16-byte MD5 of URI path name and it hashes the title of the multimedia content; Cmesh is a 64-bit integer and it encodes trick mode, track number, bitrate, index type, etc, of the files; and Range is basically an abstraction that supports various streaming protocols, such as HTTP, Real Time Messaging Protocol (RTMP), Windows Media Video (WMV), Real Time Streaming Protocol (RTSP), etc, and it sets the rang of low or high based on any index type format, for instance, byte, NPT (normal play time) and index. Within the scope of the present invention, ranges can be overlapped.

One marked advantage of the present invention is that it allows all communications between a client and the server to be on HTTP, which renders it unnecessary to have outband signaling for streaming control. Instead, streaming control is achieved the same way as in HTTP progressive downloading which only requires the client, or the viewer of multimedia content, to send an HTTP request to the server that provides multimedia content. For instance, if a client is to start playing a video from the beginning, then an HTTP request such as http://host:port/uri or http://host:port/uri?start=0 is sent to the server, which then responds by sending the video back to the client on HTTP. If a client is to play a video from a starting point in the middle of a video which may or may not correspond to a keyframe boundary, then http://host:port/uri?start=offset is used. The server then aligns the time code in the HTTP request to the nearest keyframe and sends the video back to the client. While sending video, the server sends HTTP header, followed by video header (metadata), then particles of Audio (A)/Video (V) payload. Each particle is paced at video keyframe boundary with pre-fetching time ahead of Normal Play Time (NPT). The HTTP content-length is set to the total length of a video, which is used for viewing/buffering bar management.

Within the scope of the present invention, an HTTP session can be terminated upon any of the following situations: video playback is finished, TCP error occurs, the client terminates the session, or the client pushes "Stop" button. However, "Pause" button pressing may be a pure client side behavior or it may be not, depending on client player implementation. If error occurs on the server, an error message is sent back to the client, alerting the client to close the connection.

In one embodiment of the invention, the sever receives a request in the form of HTTP URL directly from the client or through the Content Cluster Gateway. The server then paces out video data on HTTP according to NPT timecode. The content-length is specified for viewing bar except for live broadcast (live may be endless stream, so content-length may not be included in the HTTP response). Specifically, the server loads the data segments of chunk files to size and boundary aligned memory blocks. The data segment starts with range_lo, which is the NPT offset or index position in the origin video file of the first keyframe in this memory block. The data segment ends with range_hi, which is the position in origin video file of the last complete keyframe in this memory block. The content access module in the server preloads memory blocks according to range_lo, range_hi and local timer. The pacer in the sever streaming module then picks up the soon-to-expire GOPs, a.k.a. keyframes, based on keyframe's timecode and local timer, and send to the server networking module to pace data out. The server networking module reports the GOP send completion time to streaming module. Rate Adaption module makes bitrate change decision based on TCP congestion window size or TCP buffer size, or other heuristics for network speed.

One embodiment of the present invention involves Server Side HTTP Smooth Streaming, which is characterized with precise native rate control, and Real-Time TCP Round-Trip-Delay (TCP-RTD) measurement for each packet. The server of the system can determine and adjust the rate of delivery of multimedia content over a network. A specific example involves the use of TCP-RTD, measured by Kernel Streaming Engine (KSE). In one embodiment of the invention, TCP-RTD is measured via the following steps: 1) KSE receives frame sending request from video server and sends the frame via TCP channel; 2) KSE notifies the video server when the frame is acknowledged by the client; 3) The latency between 1) and 2) is measured as TCP-RTD which is measured for each packet that is transmitted. The Up/Down regulation of the transmission rate can then be triggered by the system's content access module, which is an integral component of the server, to pick up a video file of a higher or a lower bitrate to continue streaming.

One example of the triggering event for rate regulation is determined by calculating the average sending rate of the last several (e.g. 4 or 8) GOPs. If the difference of the sending rate and current streaming bitrate is greater than a predetermined threshold, then the change in bitrate may occur. However, the particular example shall not limit the present invention to simple mathematical calculation using RTP-RTD. Rather, the server may collect statistical data from the entire network system (i.e., TCP congestion window size or TCP buffer size), or from applications (i.e., outband data concerning client feedback signals), and then decide what rate is the most appropriate for the next keyframe point. The server may adjust the rate by jumping to the next adjacent bitrate or several levels away, based on the decision it has rendered. In principle, this process is dynamic and the rate adjustment is made in real time to achieve the best adaptation to the network delivery condition. However, the server can also set limitations on rate change, for instance, restrict the number of times that rate change can occur within a given period, set a range of rates that are allowed in the system, or enforce a stabilization period after a rate switch.

The present invention also renders it unnecessary to install additional desktop program, or browser plug-in for client player of multimedia content. Thus, while the present invention is applied, it is no longer necessary to download any desktop program or Active-X. Instead, it utilizes existing video player that the client already has, only adding simple plug-in when absolutely necessary for players like Flash and Silverlight video players.

Figure 4:
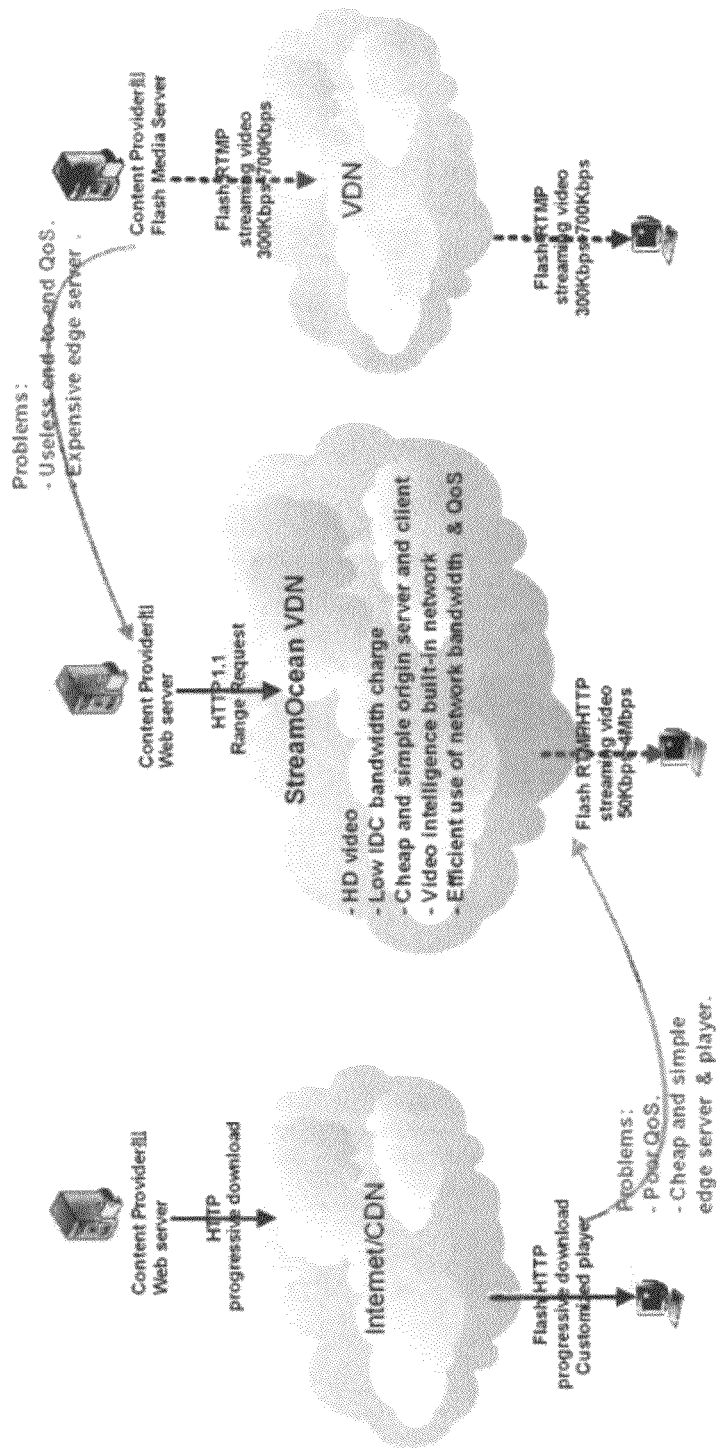
FIG. 4 is an exemplary diagram illustrating the overall advantage of the present invention in comparison with existing multimedia content transmission technologies.

The overall advantage of the present invention is summarized in FIG. 4. In comparison with existing technologies known to the inventor, the present invention is superior in the quality and long distance delivery of multimedia content, i.e., video, transmitted. It also has lower demand on the hardware, thus reducing the cost for equipment needed. The present invention also makes multimedia content transmission more adaptable for various network traffic conditions.

Figure 5A:
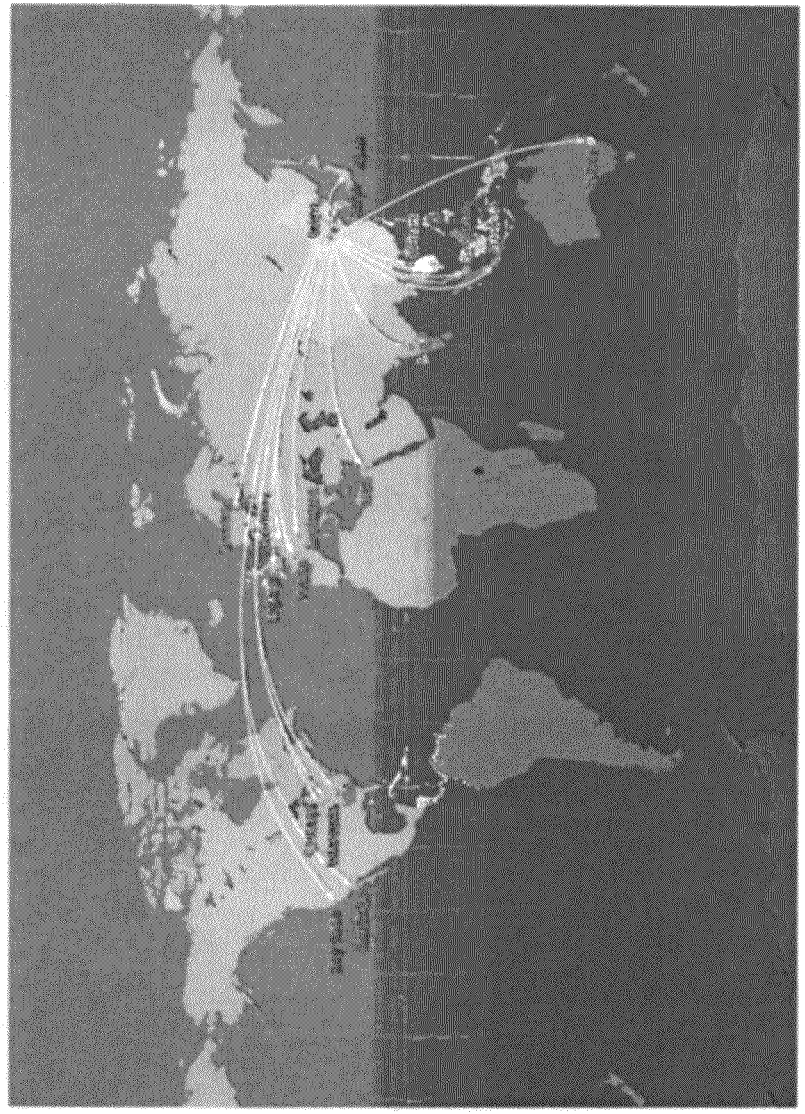
FIG. 5A is an exemplary global map illustrating the far reaching effect when the present invention is employed in video transmission over the Internet.
Figure 5B:
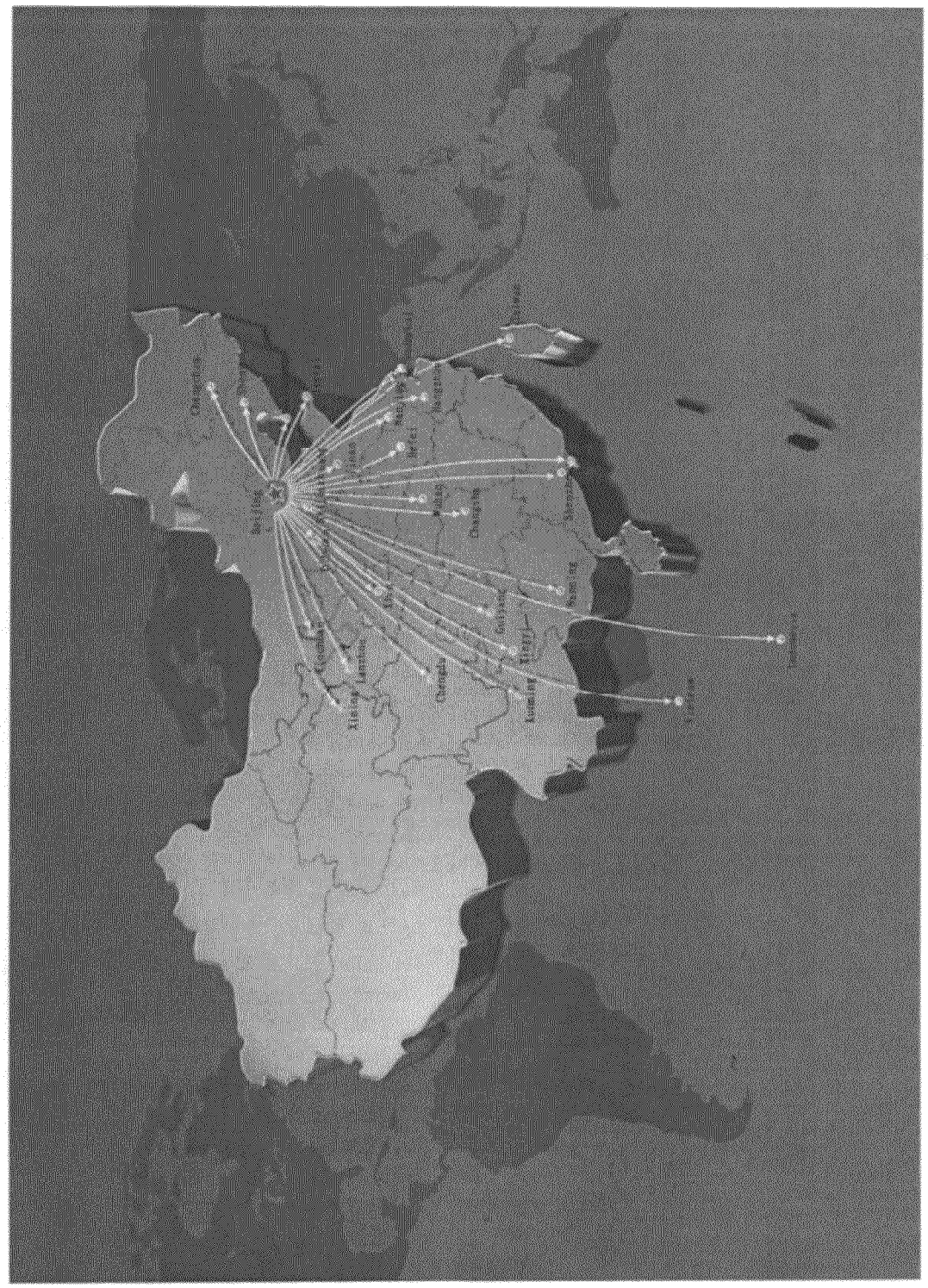
FIG. 5B is an exemplary map of China, illustrating the effect of the present invention in video transmission via the Internet.
Figure 6:
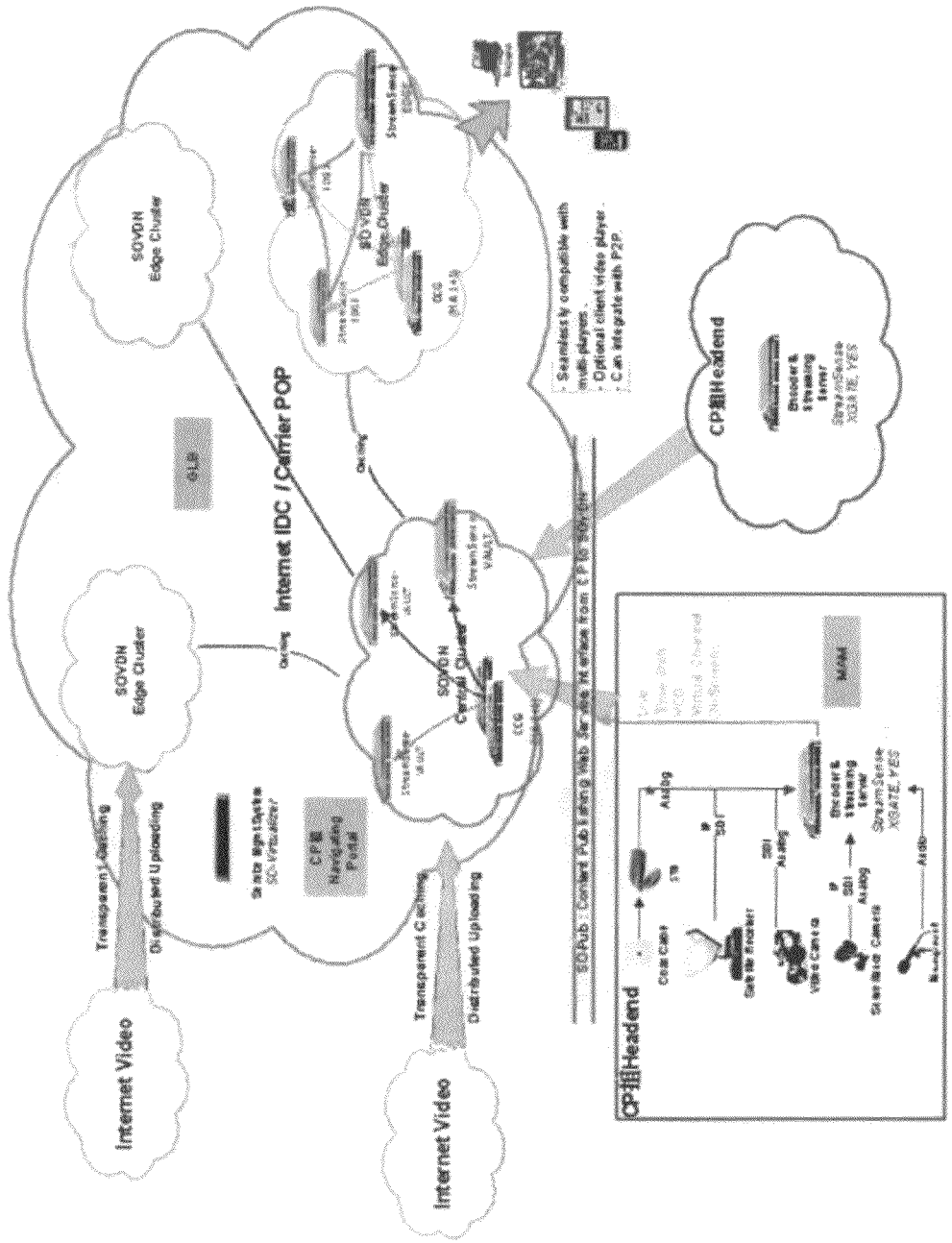
FIG. 6 is an exemplary diagram illustrating the Video Delivery Network (VDN) topology in which the present invention is employed.
Figure 7:
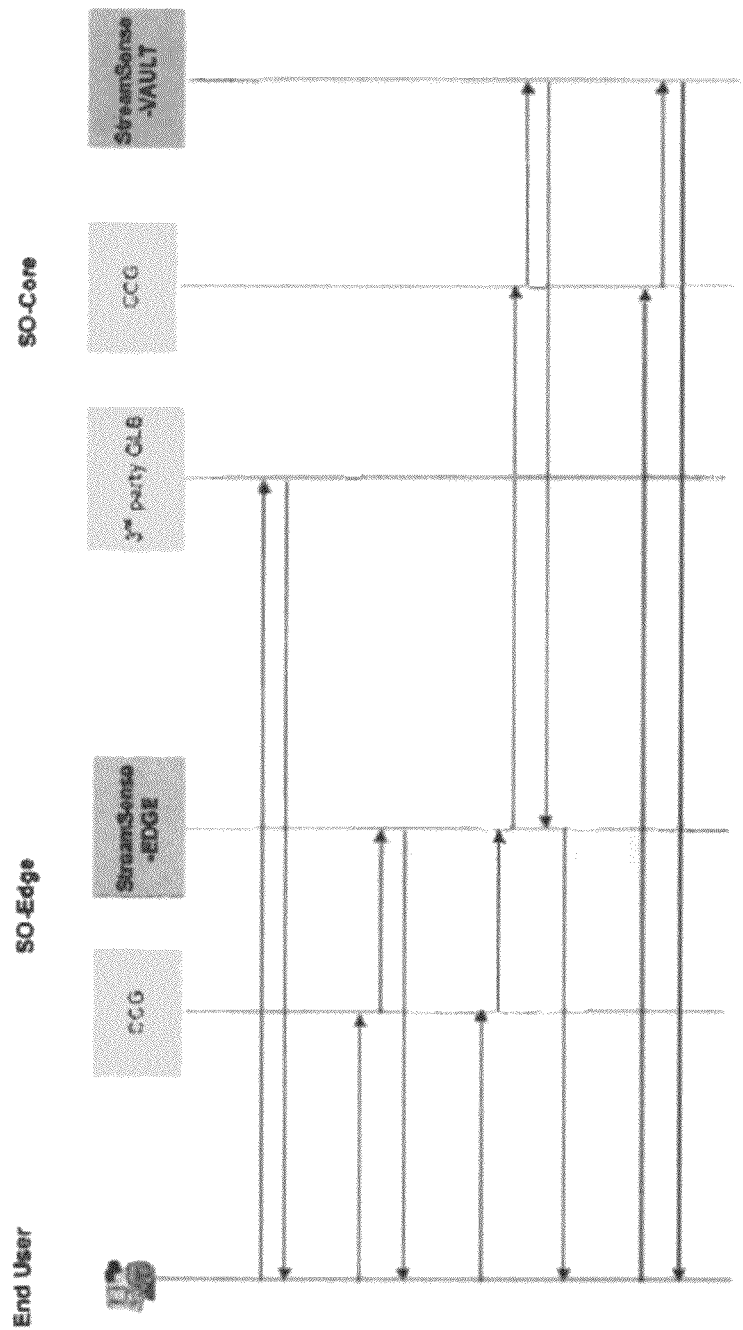
FIG. 7 is an exemplary diagram illustrating one embodiment of the system flow for multimedia content transmission over the Internet according to the invention, in the context of the VDN topology illustrated in FIG. 6.

One embodiment of the invention is exemplified in FIG. 5A, wherein it is shown that a server applied with the present invention in a Beijing Internet Data Center (IDC) reaches to clients all over the world with good control of data delivery speed and quality, despite of long distance. FIG. 5B further illustrates the comparison between the present invention with conventional multimedia content transmission technology. Servers are located in an IDC in Beijing, having 500 Kbps video ready to be viewed by clients located in another Chinese city, Shanghai, and in a US city. The distance between Beijing and Shanghai is approximately 1,300 km, whereas the distance between Beijing and a US city is at least 8-10 times of that. All clients have comparable hardware and minimum 500 Kbps bandwidth. With HTTP progressive downloading, the clients in Shanghai experience unsmooth video with constant buffering. With traditional content delivery network (CDN), the clients in the US also experience constant buffering and inconsistent video playback. In contrast, with the present invention, clients in both Shanghai and US enjoy excellent quality of video delivery, in that video playback at the client side becomes smooth after less than 4 seconds start time and after seek time, there is no longer any buffering wait time.

We claim:
1. A system to deliver multimedia content for display through a network, comprising subsystems that store, edit, process, transmit, and display multimedia content, wherein the said subsystem, either independently or collectively,
   (i) tramsits multimedia content into streaming format data format that enables smooth transmission and continuous display of multimedia content, wherein the streaming data format reflects an inherent temporal characteristic of multimedia content, wherein the inherent temporal characteristic includes a temporal series or temporal position of each portion of the multimedia content, and wherein the smooth transmission and continuous display of the multimedia content provides an uninterrupted display of the multimedia content by avoiding buffering wait times after an initial start of the display of the multimedia content, wherein the streaming data format includes index data that contain information regarding inherent characteristics, temporal processing, and/or localization of the multimedia content, wherein temporal processing includes a time to process the multimedia content, and wherein localization of the multimedia content provides transmission of the multimedia content based on a local timer; and/or (ii) arranges streaming data to allow access and retrieval through hypertext transfer protocol (HTTP); and/or (iii) regulates transmission of multimedia content to adapt to the inherent temporal characteristics of the multimedia content, a real-time traffic condition of the network, and/or display of the multimedia content to dynamically adjust a multimedia streaming bit rate to adapt to bandwidth fluctuations.

2. A system of claim 1, wherein the streaming data format include:
cluster content data with each cluster content data containing a portion of the multimedia content and an identifier for that portion of the multimedia content.

3. A system of claim 2, wherein said streaming format cluster content data includes a configurable structure and size for the temporal series representing the order in which each portion of the multimedia content is displayed, and the temporal position representing the range of each portion of the multimedia content during the display of the multimedia content, where the temporal series and the temporal position is identifiable by the identifier.

4. A system of claim 3, wherein the streaming format cluster content data may correspond to portions of multimedia content that overlap in temporal position.

5. A system of claim 3, wherein multimedia content includes those of video formats.

6. A system of claim 5, wherein said video formats include TS, FLV, MP4, and other suitable video formats.

7. A system of claim 5, wherein said streaming format cluster content files are generated according to key video frames or Group of Pictures (GOP).

8. A system of claim 1, wherein streaming data are accessible and retrievable according to the HTTP.

9. A system of claim 1, wherein transmitting of the multimedia content in the streaming data format, arranging the streaming data, and regulating transmission of the multimedia content includes a streaming control that includes Flash HTTP progressive downloading.

10. A system of claim 1, wherein the delivery of the multimedia content through the network is monitored in a close-loop feedback with successful delivery notified in the system.

11. A system of claim 10, wherein the rate of access, retrieval, and transmission of streaming data format is modified in real-time according to the network's delivery status as monitored in the system.

12. A system of claim 11, wherein the modification in a rate of delivery of multimedia content is primarily realized within the subsystem or a component where multimedia content is being sent out.

13. A system of claim 12, wherein the said subsystem or the component that realizes the modification in the rate of delivery of multimedia content includes a video server.

14. A system of claim 10, wherein the means to monitor the network's delivery includes measuring TCP Round Trip Delay (TCP-RTD), obtaining TCP congestion window size or TCP buffer size, or using any heuristics for increasing or decreasing the rate of delivery.

15. A system of claim 1, wherein the network employs a transmission means including Internet, cable, local area network, wireless communication, and telecommunication.

16. A system of claim 15, wherein multimedia content is displayed on devices that employ at least one electronic display, which the at least one electronic display includes a personal computer, a television set, a flat panel display, or a mobile device including a cell phone or a mobile television.

17. A system of claim 15, wherein multimedia content is displayed through a device that employs projection mechanisms.

18. A system of claim 17, wherein said devices includes a digital projector.

19. A method to deliver the multimedia content for display through network utilizing a system of claim 1.

20. A method of claim 19, wherein the delivery of the multimedia content is for applications including video-on-demand, live broadcasting, telesurveillance, multi-way video conferencing, and video and voice over IP applications.

21. A system to deliver multimedia content for display through a network, comprising subsystems that store, edit, process, transmit, and display multimedia content, wherein the subsystem, either independently or collectively, (i) transmits multimedia content in a streaming data format that enables smooth transmission and continuous display of multimedia content, wherein the streaming data format reflects an inherent temporal characteristic of the multimedia content, wherein the inherent temporal characteristic includes a temporal series or temporal position of each portion of the multimedia content, and wherein the smooth transmission and continuous display of the multimedia content provides an uninterrupted display of the multimedia content by avoiding buffering wait times after an initial start of the display of the multimedia content, wherein the streaming data format includes index data that contain information regarding the inherent temporal characteristics, temporal processing, and/or localization of the multimedia content, wherein temporal processing includes a time to process the multimedia content, and wherein localization of the multimedia content provides transmission of the multimedia content based on a local timer; and (ii) arranges streaming data to allow access and retrieval through hypertext transfer protocol (HTTP); and (iii) regulates transmission of multimedia content to adapt to the inherent temporal characteristics of the multimedia content, a real-time traffic condition of the network, and/or display of the multimedia content.

22. A system of claim 21, wherein the streaming data format include:
cluster content data with each cluster content data containing a portion of the multimedia content and an identifier for that portion of the multimedia content.

23. A system of claim 22, wherein the streaming format cluster content data includes a uniform structure for the in temporal series representing the order in which each portion of the multimedia content is displayed, and the temporal position representing the range of each portion of the multimedia content during the display of the multimedia content, where the temporal series and the temporal position is identifiable by the identifier.

24. A system of claim 23, wherein the streaming format cluster content data may correspond to portions of multimedia content that overlap in temporal position.

25. A system of claim 23, wherein the multimedia content includes those of video formats.

26. A system of claim 25, wherein the video formats include MPEG, FLV, MP4, and other suitable video formats.

27. A system of claim 25, wherein the streaming format cluster content files are generated according to key video frames or Group of Pictures (GOP).

28. A system of claim 21, wherein the streaming data are accessible and retrievable according to the HTTP.

29. A system of claim 21, wherein transmitting of the multimedia content in the streaming data format, arranging the streaming data, and regulating transmission of the multimedia contend includes a streaming content that includes Flash HTTP progressive downloading.

30. A system of claim 21, wherein the delivery of the multimedia content through the network is monitored using close-loop feedback with successful delivery notified in the system.

31. A system of claim 30, wherein a rate of access, retrieval, and transmission of streaming data format is modified in real-time according to a network's delivery status as monitored in the system.

32. A system of claim 31, wherein the modification in a rate of delivery of the multimedia content is primarily realized within the subsystem or a component where the multimedia content is being sent out.

33. A system of claim 32, wherein the subsystem or the component that realizes the modification in the rate of delivery of the multimedia content include a video server.

34. A system of claim 30, wherein a means to monitor the network's delivery includes measuring TCP Round Trip Delay (TCP-RTD), obtaining TCP congestion window size or TCP buffer size, or using any heuristics for increasing or decreasing the rate of delivery.

35. A method to deliver multimedia content for display through a network, involving at least one of the following steps:
(i) transmitting multimedia content into a streaming data format that enables smooth transmission and continuous display of the multimedia content, wherein the streaming data format reflects an inherent temporal characteristic of the multimedia content, wherein the inherent temporal characteristic includes a temporal series or temporal position of each portion of the multimedia content, and wherein the smooth transmission and continuous display of the multimedia content provides an uninterrupted display of the multimedia content by avoiding buffering wait times after an initial start of the display of the multimedia content, wherein the streaming data format includes index data that contain information regarding the inherent temporal characteristics, temporal processing, and/or localization of the multimedia content, wherein temporal processing includes a time to process the multimedia content, and wherein localization of the multimedia content provides transmission of the multimedia content based on a local timer;
(ii) arranges streaming data to allow access and retrieval through hypertext transfer protocol (HTTP); and
(iii) regulates transmission of the multimedia content to adapt to the inherent temporal characteristics of the multimedia content, a real-time traffic condition of the network, and/or display of the multimedia content.

36. A method of claim 35, wherein the streaming data format include:
cluster content files with each cluster content data containing a portion of the multimedia content and an identifier for that portion of the multimedia content.

37. A method of claim 36, wherein the streaming format cluster content data includes a configurable structure and size for the temporal series representing the order in which each portion of the multimedia content is displayed, and the temporal position representing the range of each portion of the multimedia content during the display of the multimedia content, where the temporal series and the temporal position is identifiable by the identifier.

38. A method of claim 37, wherein the streaming format cluster content data may correspond to portions of multimedia content that overlap in the temporal position.

39. A method of claim 37, wherein the multimedia content includes those of video formats.

40. A method of claim 39, wherein the video formats include MPEG, FLV, MP4, and other suitable video formats.

41. A method of claim 39, wherein the streaming format cluster content are generated according to key video frames or Group of Pictures (GOP).

42. A method of claim 35, wherein the streaming data are accessible and retrievable according to the HTTP.

43. A method of claim 35, wherein transmitting of the multimedia content in the streaming data format, arranging the streaming data, and regulating transmission of the multimedia content includes a streaming control that includes Flash HTTP progressive downloading.

44. A method of claim 35, wherein the delivery of the multimedia content through the network is monitored using close-loop feedback with successful delivery notified in a system.

45. A method of claim 44, wherein a rate of access, retrieval, and transmission of streaming format data is modified in real-time according to a network's delivery status as monitored in the system.

46. A method of claim 45, wherein a modification in a rate of delivery of the multimedia content is primarily realized within a subsystem or a component where the multimedia content is being sent out.

47. A method of claim 46, wherein the subsystem or the component that realizes the modification in the rate of delivery of the multimedia content includes a video server.

48. A method of claim 44, wherein a means to monitor the network's delivery includes measuring TCP Round Trip Delay (TCP-RTD), obtaining TCP congestion window size or TCP buffer size, or using any heuristics for increasing or decreasing the rate of delivery.

49. A method to deliver multimedia content for display through a network, involving the steps of:
(i) transmits multimedia content in a streaming data format that enables smooth transmission and continuous display of the multimedia content, wherein the streaming data format reflects an inherent temporal characteristic of the multimedia content, wherein the inherent temporal characteristic includes a temporal series or temporal position of each portion of the multimedia content, and wherein the smooth transmission and continuous display of the multimedia content provides an uninterrupted display of the multimedia content by avoiding buffering wait times after an initial start of the display of the multimedia content, wherein the streaming data format including index data that contain information regarding the inherent characteristics, temporal processing, and/or localization of the multimedia content, wherein temporal processing includes a time to process the multimedia content, and wherein localization of the multimedia content provides transmission of the multimedia content based on a local timer; and (ii) arranges streaming data to allow access and retrieval through hypertext transfer protocol, or HTTP; and (iii) regulates transmission of multimedia content to adapt to the inherent temporal characteristics of the multimedia content, a real-time traffic condition of the network, and/or display of the multimedia content to dynamically adjust a multimedia streaming bit rate to adapt to bandwidth fluctuations.

50. A method of claim 49, wherein the streaming data format include:
cluster content data with each cluster content data containing a portion of the multimedia content and an identifier for that portion of the multimedia content.

51. A computer system that serves to deliver multimedia content for display through a network, which performs one of the following functions:
(i) transmits multimedia content in a streaming data format that enables smooth transmission and continuous display of the multimedia content, wherein the streaming data format reflects an inherent temporal characteristic of the multimedia content, wherein the inherent temporal characteristic includes a temporal series or temporal position of each portion of the multimedia content, and wherein the smooth transmission and continuous display of the multimedia content provides an uninterrupted display of the multimedia content by avoiding buffering wait times after an initial start of the display of the multimedia content, wherein the streaming data format includes index data that contain information regarding the inherent characteristics, temporal processing, and/or localization of the multimedia content, wherein temporal processing includes a time to process the multimedia content, and wherein localization of the multimedia content provides transmission of the multimedia content based on a local timer;
(ii) arranges streaming data to allow access and retrieval through hypertext transfer protocol (HTTP); and
(iii) regulates transmission of the multimedia content to adapt to the inherent temporal characteristics of the multimedia content, a real-time traffic condition of the network, and/or display of the multimedia content to dynamically adjust a multimedia streaming bit rate to adapt to bandwidth fluctuations.

52. A computer system of claim 51, wherein the streaming data format includes:
cluster content data with each cluster content data containing a portion of the multimedia content and an identifier for that portion of the multimedia content.

53. A computer system of claim 52, wherein the streaming format cluster content includes a configurable uniform structure and size for the temporal series representing the order in which each portion of the multimedia content is displayed, and the temporal position representing the range of each portion of the multimedia content during the display of the multimedia content, where the temporal series and the temporal position is identifiable by the identifier.

54. A computer system of claim 53, wherein the streaming format cluster content data may correspond to portions of the multimedia content that overlap in the temporal position.

55. A computer system of claim 53, wherein the multimedia content includes those of video formats.

56. A computer system of claim 55, wherein the video formats include TS, FLV, MP4, and other suitable video formats.

57. A computer system of claim 55, wherein the streaming format cluster content data are generated according to key video frames or Group of Pictures (GOP).

58. A computer system of claim 51, wherein the streaming data are accessible and retrievable according to HTTP.

59. A computer system of claim 51, wherein transmitting of the multimedia content in the streaming data format, arranging the streaming data, and regulating transmission of the multimedia content includes a streaming control that includes Flash HTTP progressive downloading.

60. A computer system of claim 51, wherein the delivery of the multimedia content through the network is monitored using close-loop feedback with successful delivery notified in the system.

61. A computer system of claim 60, wherein the rate of access, retrieval, and transmission of the streaming data format is modified in real-time according to the network's delivery status as monitored by the system.

62. A computer system of claim 60, wherein a means to monitor the network's delivery includes measuring TCP Round Trip Delay (TCP-RTD), obtaining TCP congestion window size or TCP buffer size, or using any heuristics for increasing or decreasing the rate of delivery.

63. A computer system of claim 51, wherein the computer system includes a video server for Video Delivery Network (VDN).

64. A computer system of claim 63, wherein the computer system includes a web service interface which allows multimedia content provider to publish content.

65. A method wherein a computer system of claim 51 is utilized to deliver multimedia content over networks.

66. A method to deliver large data through a network, involving the steps of:
(i) converts data files into streaming data format that enables smooth and continuous transmission through a network, wherein the streaming data format include index data that contain information regarding inherent characteristics, temporal processing, and/or localization of the data file; and sliced the data files into cluster data with each cluster data containing a portion of the data file and an identifier for that portion of the data file, wherein the inherent characteristic includes a temporal series or temporal position of each portion of the multimedia content, and wherein the smooth transmission and continuous display of the multimedia content provides an uninterrupted display of the multimedia content by avoiding buffering wait times after an initial start of the display of the multimedia content, and wherein temporal processing includes a time to process the multimedia content, and wherein localization of the multimedia content provides transmission of the multimedia content based on a local timer; and
(ii) arranges streaming data to allow access and retrieval through hypertext transfer protocol (HTTP); and
(iii) publishes titles of the data files on web service interface; and
(iv) regulates transmission of the data files to adapt to the inherent characteristics of the data file, a real-time traffic condition of the network, and/or a transmission of the data files in progress.

* * * * *